US009032867B2

(12) United States Patent
Savur et al.

(10) Patent No.: US 9,032,867 B2
(45) Date of Patent: *May 19, 2015

(54) METHOD FOR CONTROLLED VENTING OF A CHAMBER

(71) Applicant: Mitsubishi Australia Ltd., Melbourne, Victoria (AU)

(72) Inventors: Sanjay Savur, Melbourne (AU); Gerrit Linde, Melbourne (AU); Rodney A. Jordan, Brisbane (AU); Lee J. Jones, Brisbane (AU); Leigh R. Barker, Brisbane (AU)

(73) Assignee: Mitsubishi Australia Ltd., Melbourne, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/196,098

(22) Filed: Mar. 4, 2014

(65) Prior Publication Data

US 2014/0242236 A1    Aug. 28, 2014

Related U.S. Application Data

(60) Division of application No. 11/385,987, filed on Mar. 20, 2006, now Pat. No. 8,677,893, which is a continuation of application No. 09/807,860, filed as application No. PCT/AU99/00909 on Oct. 19, 1999, now abandoned.

(30) Foreign Application Priority Data

Oct. 19, 1998   (AU) ............................................ 6588
Feb. 11, 1999   (AU) ............................................ 8642
Apr. 28, 1999   (AU) ............................................ 9998

(51) Int. Cl.
*B65B 25/04* (2006.01)
*B65B 55/00* (2006.01)
(Continued)

(52) U.S. Cl.
CPC ............... *A23B 7/148* (2013.01); *A23L 3/3418* (2013.01); *F16K 31/0648* (2013.01); *F16K 31/0655* (2013.01); *F25D 17/042* (2013.01); *G05D 11/138* (2013.01)

(58) Field of Classification Search
None
See application file for complete search history.

(56) References Cited

U.S. PATENT DOCUMENTS 3,102,777 A   9/1963   Bedrosian et al.
3,313,631 A   4/1967   Jensen
(Continued)

FOREIGN PATENT DOCUMENTS

EP      0136042 A2    4/1985
EP      0142903 A2    5/1985
(Continued)

OTHER PUBLICATIONS

Patent Abstracts of Japan, M-985, p. 6, JP 2-82083 (A) (Ryuhei Fukada) Mar. 22, 1990.
(Continued)

*Primary Examiner* — Joseph M Pelham
(74) *Attorney, Agent, or Firm* — Marsh Fischmann & Breyfogle LLP

(57) ABSTRACT

The present invention provides apparatus and methods for adjusting the atmosphere within a substantially sealed chamber containing respiring produce. The chamber of the present invention includes inlet means to permit ambient atmosphere to enter the chamber, and outlet means to permit chamber atmosphere to exit the chamber. Methods using apparatus of the present invention comprise:

(a) monitoring the oxygen concentration within the chamber;
(b) following detection that the oxygen concentration in the chamber has fallen below a predetermined amount, opening the inlet means so that the amount of oxygen in the chamber increases; and
(c) removing carbon dioxide from the chamber atmosphere substantially at a predetermined rate, the predetermined rate having been selected such that the carbon dioxide concentration within the chamber atmosphere does not substantially exceed a predetermined amount.

The methods may also comprise opening the inlet means for a time that is approximately proportional to the difference between the detected oxygen concentration and an oxygen setpoint.

16 Claims, 9 Drawing Sheets

(51) Int. Cl.
*A23B 7/148* (2006.01)
*G05D 21/02* (2006.01)
*A23L 3/3418* (2006.01)
*F16K 31/06* (2006.01)
*G05D 11/13* (2006.01)
*F25D 17/04* (2006.01)

(56) References Cited

U.S. PATENT DOCUMENTS

| | | |
|---|---|---|
| 3,487,769 A | 1/1970 | Dixon |
| 4,079,152 A | 3/1978 | Bedrosian et al. |
| 4,228,197 A | 10/1980 | Means |
| 4,642,996 A | 2/1987 | Harris et al. |
| 4,716,739 A * | 1/1988 | Harris et al. .................. 62/78 |
| 4,740,378 A | 4/1988 | Jameson |
| 4,817,391 A | 4/1989 | Roe et al. |
| 4,829,774 A | 5/1989 | Wassibauer |
| 4,842,875 A | 6/1989 | Anderson |
| 4,894,997 A | 1/1990 | Urushizaki et al. |
| 4,943,440 A | 7/1990 | Armstrong |
| 4,987,745 A | 1/1991 | Harris |
| 5,063,753 A | 11/1991 | Woodruff |
| 5,120,329 A | 6/1992 | Sauer et al. |
| 5,322,701 A | 6/1994 | Cullen et al. |
| 5,332,547 A | 7/1994 | Olson et al. |
| 5,457,963 A | 10/1995 | Cahill-O'Brien et al. |
| 5,623,105 A | 4/1997 | Liston et al. |
| 5,649,995 A | 7/1997 | Gast, Jr. |
| 5,791,236 A | 8/1998 | Schouten |
| 5,872,721 A | 2/1999 | Huston et al. |
| 6,092,430 A | 7/2000 | Liston et al. |
| 7,089,751 B2 * | 8/2006 | Fleming et al. .................. 62/78 |
| 2005/0235658 A1 * | 10/2005 | Fleming et al. .................. 62/78 |

FOREIGN PATENT DOCUMENTS

| | | |
|---|---|---|
| EP | 0353021 A1 | 1/1990 |
| EP | 0363553 A1 | 4/1990 |
| EP | 0551158 A1 | 7/1993 |
| WO | 89/01297 A1 | 2/1989 |
| WO | 91/11913 A1 | 8/1991 |
| WO | 91/15719 A1 | 10/1991 |
| WO | 92/15499 A1 | 9/1992 |
| WO | 95/05753 A1 | 3/1995 |
| WO | 01/83317 A1 | 11/2001 |

OTHER PUBLICATIONS

Proceedings of the International Conference on Controlled Atmosphere Packaging, Oct. 29, 1984, Ritz-Carlton Hotel.
E. Varriano-Marston et al.; Controlled Atmosphere Packaging of Produce, 1987 Produce Marketing Almanac; p. 23-29.

* cited by examiner

US 9,032,867 B2

METHOD FOR CONTROLLED VENTING OF A CHAMBER

CROSS-REFERENCE TO RELATED APPLICATIONS

This application claims the priority benefit as a divisional application of U.S. patent application Ser. No. 11/385,987, filed Mar. 20, 2006, entitled "APPARATUS FOR CONTROLLED VENTING OF A CHAMBER," which is a continuation application of U.S. patent application Ser. No. 09/807,860, filed Apr. 18, 2001, entitled "APPARATUS FOR CONTROLLED VENTING OF A CHAMBER," now abandoned, which is an application under 35 U.S.C. §371 of International Patent Application No. PCT/AU99/00909, filed Oct. 19, 1999, entitled "APPARATUS FOR CONTROLLED VENTING OF A CHAMBER." Each of the foregoing patents and patent applications is incorporated herein by reference in its entirety.

FIELD OF THE INVENTION

The present invention relates generally to the delay of deterioration of perishable products by the management of the composition of the atmosphere in contact with the product and to apparatus therefor.

BACKGROUND OF THE INVENTION

Many items of perishable produce respire after harvest. That is they consume oxygen and produce carbon dioxide. It is known that if the rate of respiration can be slowed during transportation, the produce will degrade less. The rate of respiration can be controlled by controlling the amount of oxygen and/or carbon dioxide available to the produce.

Many items of produce deteriorate after removal from the plant. This deterioration which is usually given the term senescence, can be delayed by enclosing the perishable product in a chamber to which is applied well recognised methods, such as reduction of temperature below ambient room temperature, and/or the reduction of the concentration of oxygen below that occurring in air, and/or the elevation of the concentration of carbon dioxide above the concentration occurring naturally in air. Each of these conditions may be applied alone or in combination with any or all of the others.

However if the oxygen concentration is reduced too much or the carbon dioxide concentration rises too high, then the perishable product may be injured, resulting in even more rapid deterioration than might occur if no treatment was applied. Consequently it is desirable to be able to adjust the composition of the atmosphere within the chamber and apparatus for adjusting the atmosphere in the chamber has accordingly been developed.

For transportation of perishable produce, the chamber referred to may be a shipping container, which in a common form may be fitted with a refrigeration system to adjust the temperature.

Controlled atmosphere containers are usually purpose built. However, controlled atmosphere apparatus may also be installed in a refrigerated container following a time-consuming and expensive operation.

Controlled atmosphere containers must be substantially sealed in order to separate the controlled atmosphere from the ambient atmosphere. It has been found that the door seals in controlled atmosphere containers are generally the source of most leakage. Every time the door is opened the seal is broken.

In one existing apparatus for controlling the atmosphere in a container, the atmosphere is taken from the container and passed through a device for actively modifying the atmosphere such as a carbon dioxide absorption tower and the modified atmosphere reintroduced into the container. The various devices for actively modifying the container atmosphere are expensive and generally difficult to service during transportation.

Where such apparatus is to be used to convert a refrigerated container to a controlled atmosphere container, holes may need to be made in the container walls to allow the container atmosphere to be drawn from the container to be modified and returned to the container. Such a process may need a permanent modification to be made to a refrigerated container and would be time consuming and expensive.

SUMMARY OF THE INVENTION

According to a first aspect of the present invention there is provided a method for adjusting the atmosphere within a substantially sealed chamber containing respiring produce, the chamber having inlet means to permit ambient atmosphere to enter the chamber, and outlet means to permit chamber atmosphere to exit the chamber, the method comprising:
(a) monitoring the oxygen concentration within the chamber;
(b) following detection that the oxygen concentration in the chamber has fallen below a predetermined amount, opening the inlet means to admit ambient atmosphere into the chamber so that the amount of oxygen in the chamber increases; and
(c) removing carbon dioxide from the chamber atmosphere substantially at a predetermined rate, the predetermined rate having been selected such that the carbon dioxide concentration within the chamber atmosphere does not substantially exceed a predetermined amount.

According to a further aspect of the present invention the method provides for the inlet means to be open for a time that is approximately proportional to the difference between the detected oxygen concentration and an oxygen setpoint.

According to a further aspect of the present invention, the method provides for the predetermined carbon dioxide removal rate to be calculated from a formula derived from a mathematical model of the proportions of the chamber atmosphere subject to the requirement that the oxygen concentration within the chamber be substantially maintained at a predetermined amount. The predetermined carbon dioxide removal rate is preferably calculated from a formula that produces a result substantially equal to the result produced by a calculation in accordance with the following formula:

$$a_{CO_2} = r_{CO_2} - \frac{0.79 p_{CO_2} r_{O_2}}{(0.21 - p_{O_2}) - 0.21 p_{CO_2}}$$

where $a_{CO_2}$ is the carbon dioxide removal rate; $p_{O_2}$ is the oxygen setpoint, expressed as a proportion; $p_{CO_2}$ is the desired carbon dioxide concentration within the chamber, expressed as a proportion; $r_{O_2}$ is the respiration rate; and $r_{CO_2}$ is the rate of production of carbon dioxide through respiration.

According to a further aspect of the present invention, the method provides for at least part of the carbon dioxide removal to be effected by contacting a quantity of carbon dioxide absorbing material with the chamber atmosphere. The carbon dioxide absorbing material is preferably contained in at least one carbon dioxide transmissible container, such as for example a carbon dioxide transmissible bag. Preferably, the at least one carbon dioxide transmissible container is selected so that the rate of carbon dioxide transmission into the at least one carbon dioxide transmissible container is substantially equal to the predetermined carbon dioxide removal rate.

According to a further aspect of the present invention, there is provided a method for adjusting the atmosphere within a substantially sealed chamber containing respiring produce, the chamber having inlet means to permit ambient atmosphere to enter the chamber, and outlet means to permit chamber atmosphere to exit the chamber, the method comprising:
(a) monitoring the oxygen concentration within the chamber;
(b) following detection that the oxygen concentration in the chamber has fallen below a predetermined amount, opening the inlet means to admit ambient atmosphere into the chamber so that the amount of oxygen in the chamber increases, the inlet means being open for a time that is approximately proportional to the difference between the detected oxygen concentration and an oxygen setpoint.

According to a further aspect of the present invention there is provided a method for converting a receptacle into an adjusted atmosphere chamber for containing respiring produce, the method comprising:
(a) forming a substantially sealed chamber in the receptacle optionally including installing sealing means so as to form the substantially sealed chamber in the receptacle;
(b) installing inlet means to permit ambient atmosphere to enter the chamber;
(c) installing outlet means to permit chamber atmosphere to exit the chamber;
(d) installing a controller having an oxygen concentration sensor and control means responsive to the oxygen concentration sensor, the control means being adapted to cause the inlet means to open to admit ambient atmosphere into the chamber following the oxygen concentration sensor detecting that the oxygen concentration in the chamber has fallen below a predetermined amount; and
(e) installing carbon dioxide removal means adapted to remove carbon dioxide from the chamber atmosphere substantially at a predetermined rate whereby the carbon dioxide concentration within the chamber atmosphere will not substantially exceed a predetermined amount when the chamber contains respiring produce.

According to a further aspect of the present invention the method provides for the inlet means to be open for a time that is approximately proportional to the difference between the detected oxygen concentration and an oxygen setpoint.

According to a further aspect of the present invention there is provided a receptacle when converted into an adjusted atmosphere chamber in accordance with the methods for converting a receptacle into an adjusted atmosphere chamber described herein.

According to a further aspect of the present invention there is provided apparatus for adjusting the atmosphere within a chamber comprising:
(a) sealing means for substantially sealing the chamber;
(b) inlet means to permit ambient atmosphere to enter the chamber;
(c) outlet means to permit chamber atmosphere to exit the chamber; and
(d) a controller having an oxygen concentration sensor and control means responsive to the oxygen concentration sensor, the control means being adapted to cause the inlet means to open to admit ambient atmosphere into the chamber following the oxygen concentration sensor detecting that the oxygen concentration in the chamber has fallen below a predetermined amount, the controller being adapted to cause the inlet means to remain open for a time that is approximately proportional to the difference between the detected oxygen concentration and an oxygen setpoint.

According to a further aspect of the present invention there is provided apparatus for adjusting the atmosphere within a chamber comprising:
(a) sealing means for substantially sealing the chamber;
(b) inlet means to permit ambient atmosphere to enter the chamber;
(c) outlet means to permit chamber atmosphere to exit the chamber;
(d) a controller having an oxygen concentration sensor and control means responsive to the oxygen concentration sensor, the control means being adapted to cause the inlet means to open to admit ambient atmosphere into the chamber following the oxygen concentration sensor detecting that the oxygen concentration in the chamber has fallen below a predetermined amount; and
(e) carbon dioxide reduction means adapted to remove carbon dioxide from the chamber atmosphere substantially at a predetermined rate so that, in use, the carbon dioxide concentration within the chamber atmosphere will not substantially exceed a predetermined amount when the chamber contains respiring produce.

According to a further aspect of the present invention the controller is further adapted to cause the inlet means to remain open for a time that is approximately proportional to the difference between the detected oxygen concentration and an oxygen setpoint.

According to a further aspect of the present invention there is provided apparatus for adjusting the atmosphere within a chamber comprising:
(a) sealing means for substantially sealing the chamber;
(b) inlet means to permit ambient atmosphere to enter the chamber;
(c) outlet means to permit chamber atmosphere to exit the chamber; and
(d) a controller having an oxygen concentration sensor and control means responsive to the oxygen concentration sensor, the control means being adapted to cause the inlet means to open to admit ambient atmosphere into the chamber following the oxygen concentration sensor detecting that the oxygen concentration in the chamber has fallen below a predetermined amount;
wherein said inlet means and/or outlet means comprise one or more electromagnetically actuable valves having a solenoid so that said one or more valves may be opened from a closed position and closed from an open position by applying direct electric current to the solenoid, said one or more valves being held in either the open position or the closed position in the absence of the application of said direct electric current.

According to a yet further aspect of the present invention, there is provided a method for adjusting the atmosphere within a substantially sealed chamber containing respiring produce, the chamber having inlet means to permit ambient atmosphere to enter the chamber, and outlet means to permit chamber atmosphere to exit the chamber, the method comprising:
(a) monitoring the oxygen concentration within the chamber;

(b) following detection that the oxygen concentration in the chamber has fallen below a predetermined amount, opening the inlet means to admit ambient atmosphere into the chamber so that the amount of oxygen in the chamber increases;
(c) opening the outlet means to substantially maintain the pressure within the chamber at ambient pressure; and
(d) selecting an oxygen setpoint such that steps (a), (b) and (c) cause the carbon dioxide concentration within the chamber atmosphere to not substantially exceed a predetermined amount.

According to a further aspect of the present invention, the method provides for the oxygen setpoint to be calculated from a formula derived from a mathematical model of the proportions of the chamber atmosphere subject to the requirement that the oxygen concentration within the chamber be substantially maintained at a predetermined amount. The oxygen setpoint is preferably calculated from a formula that produces a result substantially equal to the result produced by a calculation in accordance with the following formula:

$$p_{O_2} = 0.21 - p_{CO_2}(0.79 + 0.21 RQ)$$

where $p_{O_2}$ is the oxygen setpoint, expressed as a proportion; $p_{CO_2}$ is the desired carbon dioxide concentration within the chamber, expressed as a proportion; and RQ is the respiration quotient.

A chamber according to the present invention may be provided within any form of receptacle.

The invention is particularly applicable to chambers provided within a receptacle in the form of a shipping container. While it is convenient to hereinafter describe the invention in relation to that example application it is to be appreciated that the present invention is equally applicable to chambers provided by or within other forms of receptacle including cool stores, refrigerated vans, rail cars and other storage facilities.

The present invention accordingly provides in one embodiment a method for adjusting the atmosphere within a chamber. In this embodiment the method includes the step of predicting the carbon dioxide level in the chamber once the oxygen setpoint in the chamber has been determined. In this way the carbon dioxide level in the chamber may be adjusted.

It has surprisingly been found that the carbon dioxide level in the chamber can be adjusted by altering the setpoint of oxygen in the chamber. In one preferred embodiment, the oxygen level in the chamber can be set above the oxygen setpoint after flushing the chamber with a purging gas, following which the oxygen level degrades to the setpoint as a consequence of consumption of oxygen by the respiring produce, resulting in a proportional increase in the carbon dioxide level in the chamber.

A significant advantage of the invention is that carbon dioxide levels in the chamber can be accurately predicted remotely and before transport of the produce, that is, the invention does not require active monitoring and control of the carbon dioxide levels while the produce is being transported. This obviates the need for complex carbon dioxide monitoring and control apparatus, as prediction of the carbon dioxide level can be made before the produce is placed in the chamber.

The present invention provides in another separate embodiment a method for independently adjusting carbon dioxide levels in a chamber, the method including the step of placing a carbon dioxide absorbing material in the chamber whereby carbon dioxide is absorbed into the material so that the level of carbon dioxide in the chamber reaches a desired equilibrium point. This aspect of the invention is predicated on the basis that if the rate of production of carbon dioxide in the chamber by the produce is estimated, a predetermined equilibrium can be achieved by adding the required amount of carbon dioxide absorbing material to the chamber. Hence independent adjustment of the carbon dioxide level in the chamber can be achieved.

The present invention provides in another separate embodiment a method for adjusting the atmosphere within a chamber containing respiring produce, the method comprising:
(a) flushing the chamber with a purging gas containing little or no oxygen;
(b) substantially sealing the chamber either before or after step (a);
(c) adjusting the oxygen level in the chamber to a level above a desired oxygen setpoint;
(d) permitting the oxygen level in the chamber to degrade to about the oxygen setpoint as a consequence of oxygen consumed by the produce being converted to carbon dioxide;
(e) removing chamber atmosphere from the chamber; and
(f) repeating steps (c), (d) and (e) as required if the oxygen level falls below the oxygen setpoint, to maintain the oxygen level in the region of the oxygen setpoint.

The present invention provides in another separate embodiment a method for adjusting the level of carbon dioxide in a chamber containing respiring produce, the method comprising the step of placing a carbon dioxide absorbing material in the chamber so as to absorb the difference between a predicted level of carbon dioxide in the chamber based on the rate of consumption of oxygen by the produce and a desired carbon dioxide level so that the carbon dioxide concentration in the chamber does not substantially exceed said desired level.

Atmosphere adjustment apparatus provided by the present invention includes sealing means, inlet means, outlet means and a controller.

Sealing means according to the present invention is provided to substantially seal the chamber, i.e., a volume available within the receptacle for storing produce in an adjusted atmosphere.

Where a chamber according to the present invention contains respiring produce, preferably the chamber is sealed to a sufficient extent that the rate of consumption of oxygen by the respiring produce within the chamber exceeds the rate of leakage of oxygen into the chamber.

It has been found useful to conduct tests on potential containers to determine the leakage rate in order to determine whether they may be immediately employed in accordance with the present invention or whether they should be rejected or repaired. The presently preferred testing method for use in relation to (empty) shipping containers is to first seal the container with sealing means according to the present invention (to be discussed below). Following sealing, air is pumped into the container at a regulated flow rate through an appropriate fitting in an air vent in the container. At another air vent, there is provided a manometer tapping to measure the pressure inside the container.

The preferred testing method employs the principle that, at a constant pressure within the container, the flow rate into the container must equal the flow rate out of the container (through the various leakage paths). Accordingly, the flow rate of air being pumped into the container is adjusted until the pressure remains constant at a particular target pressure, preferably 50 pascals above atmospheric pressure. In the case of a 20 foot long standard refrigerated shipping container, at that pressure, a container with a leakage rate of no more than about 10 to 12 liters per minute typically represents a container suitable for use in accordance with the present invention, without any need for repair. In the case of a 40 foot long standard refrigerated shipping container, at the stated pressure, a container with a leakage rate of no more than about 25 liters per minute typically represents a container suitable for use in accordance with the present invention without any need for repair. It will be appreciated by those skilled in the art that the appropriate degree of air tightness for a container depends upon whether the produce to be stored has a high or low respiration rate and that the figures quoted are only a guide.

The sealing means may act as a moisture barrier. The sealing means may act as a barrier to the passage of gas into or out of the chamber. The chamber may comprise substantially the entire internal volume of the receptacle or a reduced volume within the chamber.

The point of entry to a chamber is liable to leak. The point of entry to a chamber is typically in the form of one or more doors. In particular, it has been found that for shipping containers, the seals of the doors of the container are generally the source of most leakage. Consequently, the sealing means provided in accordance with the present invention may include door sealing means.

The sealing means provided by the present invention may also include a curtain. The curtain may comprise a substantially fluid impervious sheet. The curtain may substantially seal an open end of a receptacle to form the chamber. The curtain may seal the chamber from leakage paths in the receptacle that are outside the chamber. In particular, the curtain may seal the chamber from any leakage paths in the door seals of the receptacle by being interposed between the chamber and receptacle door.

A curtain may be attached to the internal and/or external walls of the receptacle by any suitable means. Adhesive, including tape or glue, may be used.

In a preferred embodiment of the present invention, there is provided a curtain for use in conjunction with a receptacle made from a magnetic material, such as a steel shipping container. The curtain is provided with numerous permanent magnets adjacent its periphery for attaching the curtain to the receptacle. In a particularly preferred embodiment for use in conjunction with a steel shipping container, the curtain is installed in the container when the doors are open by attaching the magnets to the external walls of the container. Once the curtain is suitably placed, the doors of the container are closed to thereby substantially seal the curtain against the container.

A curtain according to one aspect of the present invention is preferably located close to the door of the receptacle in order to maximise the volume of the chamber. The curtain is preferably approximately coplanar with the receptacle door when the curtain is in a substantially un-deformed state where there is equal pressure on either side of the curtain.

Refrigerated shipping containers (sometimes known as reefer containers) are generally of a standard style of construction. Such containers typically have a false floor. The produce sits on the false floor which is spaced from the outer wall of the container to facilitate air flow within the container. The false floor typically terminates a short distance from the end of the container to facilitate air flow at the ends of the load stored within the container.

The curtain is preferably located within the space between the container door and the beginning of the false floor.

In this arrangement the chamber is accordingly bounded by the container walls and the curtain with the space between the curtain and the container door being outside the chamber.

The sealing means provided in accordance with the present invention may also include a cover for any ventilation port in the shipping container or other receptacle. The cover may comprise a sheet of flexible material such as an expanded rubber sheet. The sheet may be initially oversized and subsequently trimmed on site to form a cover which matches the profile of the ventilation port whereby to seal it. The cover may be installed over the ventilation port by any means. Preferably the cover is adhered to the port and/or the wall immediately surrounding the port with tape and/or glue. Where a port comprises a number of apertures, one or more covers may be used to seal the port.

The cover is substantially impermeable. The cover may include one or more layers which are not substantially impermeable. In this case, the cover may include a substantially impermeable layer such as an adhesive sheet to adhere the cover to the port and/or the wall immediately surrounding the port. The substantially impermeable adhesive sheet is preferably applied so as to substantially cover the permeable material. In this way the cover may be rendered substantially impermeable.

The inlet and outlet means provided in accordance with the present invention may be operable to facilitate respectively the inflow of ambient atmosphere into the chamber and the outflow of chamber atmosphere from the chamber.

The inlet and outlet means may each comprise one or more valves operable to provide in an open position communication between the chamber atmosphere within the chamber and the ambient atmosphere surrounding the chamber. Each valve may be operable in a closed position to substantially restrict such communication.

The inlet means and the outlet means each may be located in any boundary of the chamber.

In a typical arrangement, the outlet means is located adjacent to a fan provided in the chamber for circulating air within the chamber. Preferably, the outlet means is mounted in a ventilation port near the fan. In the case of a standard refrigerated shipping container having a fan at one end of the container, the outlet means is preferably mounted in the ventilation port that is typically located adjacent to the fan.

The outlet means is preferably located on the high pressure side of the fan so that when the outlet is open, chamber atmosphere is forced out of the chamber.

The inlet means is preferably spaced from the outlet means. Preferably the arrangement of the inlet means and outlet means is such as to facilitate the free flow of atmosphere between the interior and exterior of the chamber. Most preferably the inlet and outlet means are positioned relative to one another so as to facilitate cross-flow ventilation when each is in the open position.

Most preferably the inlet and outlet means are located at either end of the chamber. The inlet means may be mounted in a curtain according to the present invention. In this case, installation of the curtain also includes installation of the inlet means. The inlet means and the outlet means may each include a plurality of valves. Such valves may be spaced from one another in locations which facilitate the desired air flow.

The valves comprising the inlet and outlet means may be operable in response to a signal from the controller. Each valve may be connected to the controller by wire or other means for conveying a signal from the controller to the valve.

Each valve provided according to the present invention may be magnetically operable between an open position and a closed position. A solenoid is preferably provided to generate a magnetic field in response to the application of a direct current whereby to urge the valve toward an open or a closed position dependent upon current direction.

Valves comprising the inlet and outlet means according to the present invention are preferably electromagnetically actuable valves having a solenoid so that they may be opened from a closed position and closed from an open position by applying direct electric current to the solenoid, said one or more valves being held in either the open position or the closed position in the absence of the application of said direct electric current.

Valves according to the present invention preferably may be both opened from a closed position and closed from an open position by applying a pulse of direct electric current to the solenoid. Preferably, the valves are adapted to be held in the closed position or the open position in the absence of an electric current in the solenoid by magnetic forces.

According to an aspect of the present invention, a valve comprising the inlet or outlet means according to the present invention comprises a bore, a member moveable within the bore, at least one sealing surface associated with the member, at least one aperture through which fluid may pass to pass through the valve, a solenoid adapted to generate a magnetic field in the bore in response to the application of a direct electric current, the member being adapted to move with respect to the bore in response to said magnetic field between a valve open position wherein fluid passes through said at least one aperture and a valve closed position wherein said at least one sealing surface prevents fluid passing through each said at least one aperture. Preferably, the member is a slidable within the bore. Preferably, the slidable member carries at least one cover adapted to cover each said at least one aperture to prevent fluid passing through said at least one aperture.

According to an aspect of the present invention, a valve comprising the inlet or outlet means according to the present invention comprises at least one aperture through which fluid may pass to pass through the valve, a solenoid to generate a magnetic field in response to the application of a direct electric current and a flap which is adapted to move in response to said magnetic field between a valve open position wherein fluid may pass through the valve through said at least one aperture and a valve closed position wherein the flap prevents fluid passing through the valve through any said at least one aperture.

Preferably, the solenoid is located between the flap and a member carried by the flap, the member and the flap each having a permanent magnet so arranged that when a direct electric current is passed through the valve in one direction the solenoid attracts the magnet on the member and repulses the magnet on the flap in order to move the flap to a valve open position and when a direct electric current is passed through the solenoid in a direction opposite to said one direction the solenoid repulses the magnet on the member and attracts the magnet on the flap in order to move the flap to a valve closed position.

Preferably an armature is provided in the solenoid and the flap may held in the valve open position in the absence of an electric current in the solenoid by the magnetic attraction between the armature and the magnet on the member, and the flap may held in the valve closed position in the absence of an electric current in the solenoid by the magnetic attraction between the armature and the magnet on the flap.

In one preferred form a valve comprises a magnetic member moveable along a bore in response to the field generated by passing a direct current through a solenoid surrounding the bore. The member may be captured within the bore and moveable between positions which open and close the valve.

The magnetic member may take any suitable shape. The magnetic member may be a ball. It may be a right circular cylinder. It may be a prismatic member having a cross-section of any suitable shape. Other magnetic member shapes are envisaged within the scope of the invention.

In one embodiment of this principle, the magnetic member is in the form of a ball. The valve contains a hole through which fluid must pass to pass through the valve. The ball seals the valve by sealingly abutting the edge of the hole. Preferably the hole is a hole in a plate in the valve. The diameter of the ball is greater than the diameter of the hole.

In another embodiment of this principle, the magnetic member is in the form of a member which is slidable with respect to the valve body. Preferably, the slidable member is a cylindrical rod. The slidable member carries a cover with a sealing surface. Preferably the cover is a panel with an annular sealing surface. The fluid path through the valve when the valve is open includes one or more holes. Preferably the holes are holes in a plate in the valve. The cover seals the valve by sealingly abutting the surface around the holes. Where the cover is a panel with an annular sealing surface, the valve is closed by the annular sealing surface sealingly abutting the surface around the holes. The outer diameter of the annular sealing surface is greater than the diameter of a circle surrounding the hole or holes. Preferably, the inner diameter of the annular sealing surface is also greater than the diameter of a circle surrounding the hole or holes.

In another preferred form the valve comprises a flap moveable under the application of a magnetic field between open and closed positions. The flap may carry a magnet. The flap may be hingedly mounted with respect to a base. The base may carry a solenoid or coil for generating a magnetic field to open or close the flap and hence the valve in response to a signal from the controller.

A valve according to the present invention may be provided with a casing. Any such casing must allow sufficient fluid flow through the valve when the valve is open. The casing may only partially encase the valve. The casing may be apertured. In particular, a casing may contain holes. Such holes may be any suitable shape. They may be circular. They may be slots. Other aperture shapes are envisaged within the scope of the invention.

Where a valve according to the present invention has an apertured casing, preferably the apertures are located so that any relative movement between the valve and the contents of the chamber or another part of the chamber will not prevent fluid flowing through the valve when the valve is open. In particular, where a valve with an apertured casing is mounted on a curtain according to the present invention, preferably the apertures are located so that the apertures will not be obstructed so as to ensure that the flow of fluid is not restricted to any significant extent.

For example, where a valve with a casing is mounted in a curtain which is approximately coplanar with the receptacle door when the curtain is in a substantially un-deformed state, preferably the casing includes apertures on the side of the valve rather than, or in addition to, the front or back face of the valve so that if the valve moves so that the front or back face abuts the door or another object with its front or back face, the apertures will not thereby be obstructed.

Where there is a curtain according to the present invention that is flexible, the differential between the pressures of the atmospheres on each side of the curtain may vary at different points on the curtain. This variation can cause the curtain to move somewhat erratically. To facilitate equalisation of the pressure differential over the surface of the curtain, the curtain may be provided with inlet means in the form of valves that are spaced apart. In a typical arrangement a curtain may carry inlet means in the form of a pair of valves. One valve may be located in the upper portion and the other in the lower portion of the curtain.

As can be appreciated by those skilled in the art, the above described preferred locations of the outlet means and the inlet means may be interchanged whereby the outlet means may be located in a curtain according to the present invention and the inlet means may be located near the fan. In this configuration the inlet means communicates with one of the apertures of the ventilation port that is located near the fan provided in the chamber for circulating air within the chamber. Such an inlet means is to be located on the low pressure side of the fan so that when the inlet means is open, the atmosphere outside the chamber is pushed into the chamber. In this arrangement outlet means may be mounted in a curtain according to the present invention.

A controller according to the present invention includes sensor means and control means. The sensor means is operable for sensing the concentration of oxygen. The sensor means may also sense other variables within the chamber, for example, humidity. Preferably the sensor means includes an oxygen concentration measurement device which provides an output in the form of an electrical signal containing information about the oxygen concentration level within the chamber. Such an electrical signal may be a direct current signal having voltage proportional to oxygen concentration or the signal may digitally encode the oxygen concentration level or a number that is proportional, or otherwise in known relation to, the oxygen concentration. Other forms of output are also envisaged within the scope of the present invention.

A controller according to the present invention may include means to receive and respond to the sensor means output. Such response may include activating one or more valves or other devices subject to the control of the controller. The controller may be operatively connected to the valves by direct wire connection or other means for facilitating the activation of one or more valves by the controller. The controller may receive signals from the sensor means continuously or may sample the signals discontinuously. Where the signals are sampled discontinuously, the sampling intervals may be equal or unequal. The sampling interval may be made to vary according to the output of the sensor means or may be fixed.

Modification means according to the present invention preferably includes a passive carbon dioxide concentration reduction means. Preferably the reduction means comprises a predetermined quantity of a suitable substance for extracting carbon dioxide from the atmosphere, such as hydrated lime, held in carbon dioxide transmissible bags. Such reduction means is already known in the art. The quantity of suitable substance to be placed within the chamber may be calculated from a knowledge of the total amount of carbon dioxide above the maximum tolerable amount of carbon dioxide within the chamber that is likely to enter the chamber and/or be produced through respiration of produce. This maximum amount may be estimated from a knowledge of the temperature at which the chamber is to be held, the time throughout which the atmosphere is to be adjusted, the amount of produce to be stored within the chamber and the respiration rate of the produce to be stored within the chamber. The means of estimation is further discussed below.

Modification means according to the present invention may include a humidifier preferably a passive humidifier. A passive humidifier may comprise a tray for catching water dripping from the evaporation coil of a refrigeration unit within the chamber. The humidifier may include wick means for conveying the water to a point near the fan for circulating air within the chamber so that the moisture may be blown into the chamber to increase the humidity thereof.

After produce has been loaded into a chamber fitted with atmosphere adjustment apparatus according to the present invention the chamber may be flushed with a gas having a low oxygen concentration or containing no oxygen. Nitrogen may be used as the gas. Such a gas flushing step may be effected to lower the initial oxygen concentration within the chamber to below a predetermined maximum oxygen concentration. If the oxygen content is thereby lowered below a predetermined minimum oxygen concentration, the controller may operate to cause the oxygen concentration within the chamber to be increased. If such a gas flushing step were not carried out, it would take considerable time for the oxygen concentration within the chamber to be lowered as a result of consumption of oxygen by produce during respiration.

The gas flushing step may be effected to lower the initial oxygen concentration within the chamber to within a few percent of the oxygen setpoint. If the oxygen content is lowered to the oxygen setpoint by the action of respiring produce, it has been observed that there is a corresponding proportional increase in the carbon dioxide level in the chamber.

Prediction of the desired characteristics of the absorbing unit to achieve the desired concentration of carbon dioxide corresponding to a particular oxygen pre-set level in the chamber is also based on, amongst other things, the weight of the cargo, the temperature in the chamber, the time during which the cargo will be in transit, and the respiration quotient of the produce.

In use, when the oxygen concentration within the chamber falls below a first predetermined minimum value, the controller causes the inlet means and/or the outlet means to open for a first predetermined length or lengths of time (as the case may be) so as to allow air surrounding the chamber to enter the chamber and/or atmosphere from within the chamber to exit the chamber. The influx of air into the chamber will thereby increase the oxygen concentration within the chamber.

The inlet means and the outlet means may be opened simultaneously. They may be closed simultaneously. They may be opened at different times. They may be closed at different times. The option of staggering the opening (or closing) of the inlet means with respect to the opening (or closing) of the outlet means, as compared to simply opening and closing the inlet means and outlet means simultaneously, can allow additional control over the rate of variation of the concentrations of gases within the chamber.

If, after the inlet means and/or outlet means have closed, the oxygen concentration as measured by the sensor means has not increased to at least a second predetermined minimum value, the controller may cause the inlet means and/or the outlet means to switch to an open state for a second predetermined length or lengths of time (as the case may be) so as to allow further air surrounding the chamber to enter the chamber and/or atmosphere from within the chamber to exit the chamber. The second predetermined minimum value of the oxygen concentration may be equal or unequal to the first predetermined minimum value of the oxygen concentration.

This process may be repeated until the oxygen concentration has increased to an acceptable level.

If, after the inlet means and/or outlet means have closed, the oxygen concentration within the chamber as measured by the sensor means has not increased to at least the second predetermined minimum value, the controller may determine not to cause the inlet means and/or outlet means to switch to an open state for any second or subsequent predetermined lengths of time in order to allow time for the oxygen concentration as measured by the sensor means to increase due to mixing of the atmosphere within the chamber.

In a given cycle of increasing the oxygen concentration within the chamber, where the inlet and/or outlet means are opened for a second or subsequent predetermined length or lengths of time, the various predetermined lengths of time may be equal or unequal. Preferably, each subsequent opening of the inlet and/or outlet means within a single cycle of increasing the oxygen concentration within the chamber is longer than the previous. For example, preferably the second predetermined length or lengths of time are longer than the first predetermined length or lengths of time, the third is or are longer than the second and so on.

In a given cycle of increasing the oxygen concentration within the chamber, where the inlet and/or outlet means are opened for a second or subsequent predetermined length or lengths of time, the various predetermined lengths of time may be adjusted by the controller in response to the measurements of the sensor means.

In a preferred embodiment of the present invention, the inlet means and outlet means are each opened and closed together, that is, they are each opened and closed at the same times.

Preferably, the length of time for which the inlet means and outlet means are open is approximately proportional to the difference between the measured oxygen concentration and the oxygen setpoint. By "approximately proportional", we mean that the length of time the inlet means is open should be small if the difference is small and large if the difference is large. A true proportionality in the sense of a linear relationship between oxygen concentration difference and length of time of opening of the inlet means, is not required. (This situation only arises when the measured oxygen concentration is less than the oxygen setpoint because when the measured oxygen concentration exceeds the oxygen setpoint, the inlet means and outlet means would remain closed.)

In a preferred embodiment of the present invention, where the chamber according to the present invention is formed within a refrigeratable shipping container, the following logic is used to control the oxygen concentration within the chamber:

1. Measurement of chamber oxygen concentration takes place every 8 minutes.
2. If the difference between the measured oxygen concentration and the oxygen setpoint is more than 0.9%, then the inlet means is opened to allow ambient air to enter the chamber to thereby increase the oxygen concentration within the chamber. (For the avoidance of doubt, the reference to "0.9%" is in units of chamber oxygen concentration and does not represent a proportion of the oxygen setpoint.) The inlet means is closed after the measured oxygen concentration has exceeded the oxygen setpoint.
3. If the measured oxygen concentration is in the range 0 to 0.9% less than the oxygen setpoint, then the inlet means is opened to allow ambient air to enter the chamber to thereby increase the oxygen concentration within the chamber. The inlet means is closed after a time that is dependent on the oxygen concentration as measured prior to opening the inlet means, as follows:

| Setpoint-oxygen concentration (%) | Time (minutes) |
|---|---|
| above 0 to 0.09 | 1.5 |
| above 0.09 to 0.18 | 2 |
| above 0.18 to 0.27 | 2.5 |
| above 0.27 to 0.36 | 3 |

-continued

| Setpoint-oxygen concentration (%) | Time (minutes) |
|---|---|
| above 0.36 to 0.45 | 3.5 |
| above 0.45 to 0.54 | 4 |
| above 0.54 to 0.63 | 4.5 |
| above 0.63 to 0.72 | 5 |
| above 0.72 to 0.81 | 5.5 |
| above 0.81 to 0.9 | 6 |

In one preferred embodiment of the present invention methods according to the invention include the determination of a respiration quotient of a particular produce to be placed in the chamber, that is, the amount of oxygen which converts to carbon dioxide by respiration of that produce. The respiration quotient is produce dependent, although in general terms it has been observed there is a directly proportional relationship between the amount of oxygen consumed by the produce which converts to carbon dioxide. Hence, generation of carbon dioxide within the chamber has been found to be dependent on the oxygen level within the chamber. In a sealed chamber whose volume has produce and air, it has been observed that the produce consumes oxygen thereby reducing the oxygen level in the chamber. As a consequence of consumption of the available oxygen, the produce gives off a proportional amount of carbon dioxide to the oxygen consumed.

By way of example, it is well known that ambient air contains approximately 21% oxygen by volume. If an oxygen level of 6% in a chamber containing produce and ambient air is required, it can be predicted in accordance with the present invention that the composition of the atmosphere in the chamber will over time contain approximately 15% carbon dioxide (from an approximately zero base) as a consequence of the consumption of oxygen by the produce. Similarly, if a level of 3% oxygen in the chamber is required, it can be predicted that the composition of the atmosphere in the chamber will over time contain approximately 18% carbon dioxide (from an approximately zero base) as a consequence of the consumption of oxygen by the produce.

In accordance with the method for independent adjustment of the carbon dioxide level, the carbon dioxide absorbing material may be provided so as to absorb the difference between the predicted level of carbon dioxide to be generated and a desired equilibrium point, say 10%. A calculation may hence in one embodiment be performed based on the known absorption characteristics of the carbon dioxide absorbing material and the desired degree of absorption of carbon dioxide, to arrive at an estimate of the amount of material required to absorb the difference in the predicted level of carbon dioxide and the desired carbon dioxide equilibrium point.

In general, a carbon dioxide level in the chamber in the range of about 0 to 15% by volume of the chamber is desired. The advantage of having at least a proportion of carbon dioxide in the composition of the chamber atmosphere is that it assists in the produce retaining its colour, inhibits the growth of mould and rots, and assists in retardation of produce ripening. Too much carbon dioxide could however cause deterioration in produce quality.

In accordance with one preferred embodiment of the present invention, if for example an oxygen setpoint of 5% by volume in the chamber is required, the oxygen level is initially reduced to within about 3% above the setpoint, following which the oxygen level degrades to 5% and the carbon dioxide level increases to approximately 3% (from an approximately zero base). The oxygen level can be held at the oxygen setpoint by allowing air into the chamber if the level falls below the setpoint.

Naturally however, the produce will continue to consume oxygen and hence carbon dioxide will continue to be produced. Independent adjustment of the carbon dioxide level can be achieved by placing a carbon dioxide absorbing material, such as one or more containers of hydrated lime of predetermined transmissibility to carbon dioxide in the chamber, so as to absorb the difference between the predicted carbon dioxide in the chamber (based on the predicted rate of consumption of oxygen by the produce) and the desired level.

The present invention provides in one particularly preferred embodiment a method for adjusting the atmosphere within a chamber for containing respiring produce, the method including the steps of predicting the carbon dioxide level in the chamber once the oxygen setpoint in the chamber has been determined, and independently adjusting the carbon dioxide level in the chamber by determining the difference between the predicted level of carbon dioxide in the chamber and the desired carbon dioxide equilibrium point and adding one or more containers of hydrated lime of predetermined transmissibility to carbon dioxide to the chamber whereby carbon dioxide is absorbed into the bags so that it reaches the desired equilibrium point, whereby to adjust the level of carbon dioxide in the chamber.

In describing the operation of the present invention, it is convenient to first describe an embodiment in which the carbon dioxide level in the chamber is not modified.

Following sealing of the chamber, respiration of the produce will cause the oxygen concentration in the chamber to decrease and the carbon dioxide concentration to increase. If the initial chamber atmosphere is ambient atmosphere, then the initial carbon dioxide concentration is zero to a good approximation. The molar amount of carbon dioxide produced during respiration is, by definition, the product of the amount of oxygen consumed and the respiration quotient.

The inlet means and outlet means of the present invention will remain closed until the sensor detects that the oxygen concentration within the chamber has fallen below a predetermined amount (which is typically set within a particular margin or tolerance of the oxygen setpoint). Continued respiration of the produce causes, or would cause, the oxygen concentration within the chamber to go below the set point (or below a level within an appropriate margin or tolerance in the set point). Apparatus of the present invention causes the inlet means and the outlet means to open for respective predetermined lengths of time (but not necessarily for, or at, the same time) to increase the oxygen concentration within the chamber.

The cycle of opening the inlet means and outlet means when the oxygen concentration has fallen below a predetermined amount continues in order to maintain the oxygen concentration in the chamber substantially at the oxygen setpoint.

Although inflow and outflow to and from the chamber occurs at discrete time intervals as described, it is useful to model the process as a continuous process by assuming that there is a constant rate of inflow of air, a constant rate of outflow of chamber atmosphere and a constant rate of respiration within the chamber. The notional continuous flow rates may be considered as a form of average of the actual, discrete, flow rates. The invention is not to be construed as being in any way limited to a theoretical mode of action, model or description. However, as will be seen, such a model is useful in adjusting the carbon dioxide concentration within the chamber.

In the absence of controlling the carbon dioxide concentration in the chamber, the carbon dioxide concentration in the chamber will reach an equilibrium value. At equilibrium, the rate of production of carbon dioxide in the chamber through respiration balances the rate of carbon dioxide exiting the chamber through the outlet means. In calculating the equilibrium carbon dioxide concentration, a model with the following assumptions is used:

1. The chamber atmosphere exiting the chamber through the outlet means is perfectly mixed (i.e., it is assumed that the proportions of constituent gases of the atmosphere exiting the chamber is equal to the proportions of constituent gases within the chamber).
2. The composition of the air entering the chamber through the inlet means consists of 21% oxygen and 79% nitrogen.
3. The rate of inflow of nitrogen is equal to the rate of outflow of nitrogen.

Calculations according to the above model are presented in the Appendix to this specification.

Using a model having the above assumptions, the carbon dioxide concentration in the chamber atmosphere at equilibrium in the absence of carbon dioxide modification within the chamber $p^*_{CO_2}$ is approximately $RQ \cdot (0.21 - p_{O_2})$ where $p_{O_2}$ is the oxygen setpoint, and RQ is the respiration quotient. (The correct expression using the model is $$p^*_{CO_2} = \frac{RQ \cdot (0.21 - p_{O_2})}{0.70 + 0.21 \cdot RQ},$$

see equation (9) in the Appendix.)

For example, when the oxygen concentration by volume is reduced from ambient level (ie 21%) to a setpoint of, say, 6%, then the carbon dioxide concentration will approximately be 15% from an approximately zero base, assuming a respiration quotient of unity.

When an initial gas flushing step as described is used, the carbon dioxide concentration will still reach the same equilibrium concentration $p^*_{CO_2}$ as when no initial gas flushing step is used. Consequently, the present invention includes a method for estimating the equilibrium carbon dioxide concentration based on only the oxygen set point and the respiration quotient.

Using the previous numerical example, if an oxygen set point of 6% is adopted, then (using a respiration quotient of unity), the carbon dioxide concentration in the chamber will ultimately reach an equilibrium concentration of 15%, whether the initial chamber atmosphere is ambient and whether or not an initial inert gas flushing step as described is used.

According to the present invention the equilibrium carbon dioxide concentration in the chamber may be modified without any monitoring of the carbon dioxide level in the chamber. From equation (10) in the Appendix, the rate of carbon dioxide absorption can be calculated. For example, if an oxygen set point of 6% is used, then as previously stated, in the absence of carbon dioxide absorption, the equilibrium carbon dioxide concentration will be approximately 15%. If it is desired to have an equilibrium carbon dioxide concentration of 10%, then from equation (10) or (12), the rate of carbon dioxide absorption required will be approximately $0.39 \, r_{O_2}$, ie 0.39 times the rate of respiration rate of the produce (assuming a respiration quotient of unity).

Once the required carbon dioxide absorption rate $a_{CO_2}$ is known, this information may be used to calculate the carbon dioxide transmissibility properties of a container of carbon dioxide absorbing material, such as bags of lime.

Commercial films of known carbon dioxide transmissibility are typically specified with reference to a transmission coefficient $k_f$ which represents the flow rate of carbon dioxide through the film (typically in liters per minute), per percent of carbon dioxide in the atmosphere, per unit area of film (typically in square meters). Thus, if the required rate of carbon dioxide absorption is expressed in suitable flow units (designated $a'_{CO_2}$) (eg units of flow rate such as liters per minute), then the product of the area of the film and the transmission coefficient will equal the quotient of the carbon dioxide absorption rate and the carbon dioxide equilibrium concentration. That is, $$k_f A = \frac{a'_{CO_2}}{p_{CO_2}}.$$

Suitable carbon dioxide transmissible containers may then be selected based on the product $k_f A$.

According to the method of the present invention, the predicted equilibrium carbon dioxide concentration in the chamber can be set in advance so that it will reach the desired level by using a carbon dioxide concentration reduction means (such as carbon dioxide transmissible containers filled with carbon dioxide absorbing material).

The amount of carbon dioxide absorbing material placed in the carbon dioxide transmissible containers should be sufficient to be capable of absorbing all the carbon dioxide that enters the carbon dioxide transmissible containers and therefore needs to be a sufficient amount to last the estimated time of storage of produce within the chamber.

It will be readily appreciated by those skilled in the art that other suitable forms of modelling the proportions of chamber atmosphere may be used, and such models are considered to fall within the scope of the present invention. For example, a model may take into consideration a factor for leakage from the container. A model may be based on discrete time intervals rather than using the continuous flow approximation.

BRIEF DESCRIPTION OF THE DRAWINGS

A preferred embodiment of the invention will now be described with reference to the accompanying drawings in which.

BRIEF DESCRIPTION OF PREFERRED EMBODIMENT

Figure 1:
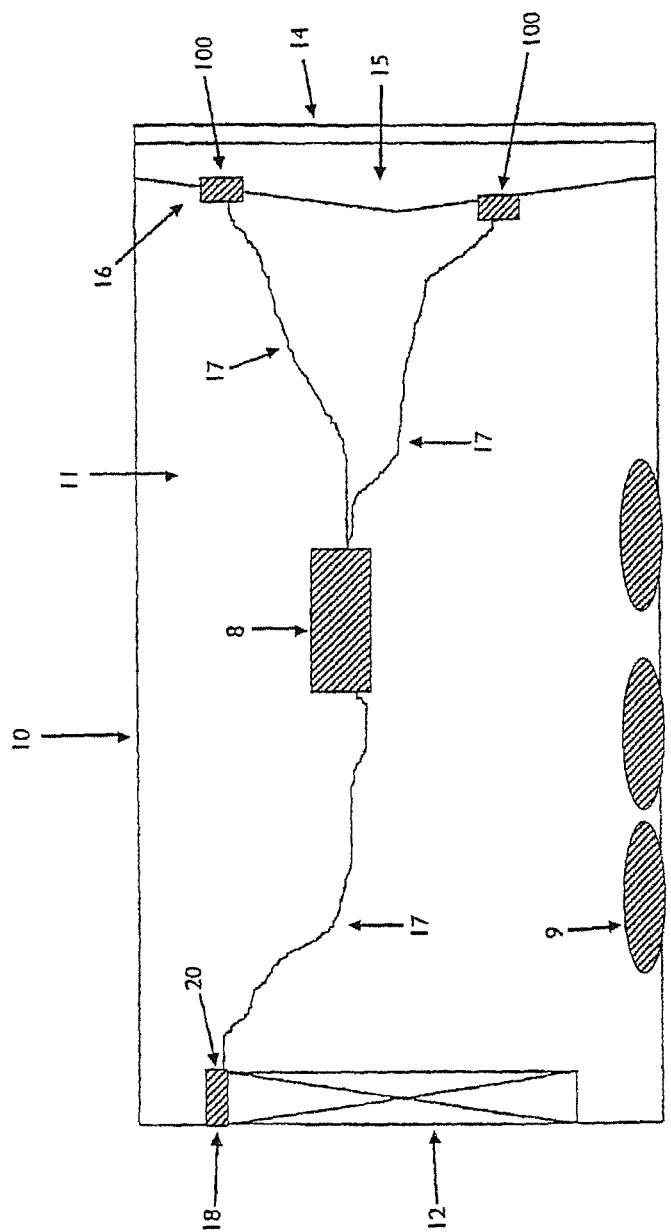
FIG. 1 is a schematic side view of a standard refrigerated container fitted with atmosphere adjustment apparatus according to a preferred embodiment of the present invention.
Figure 4:
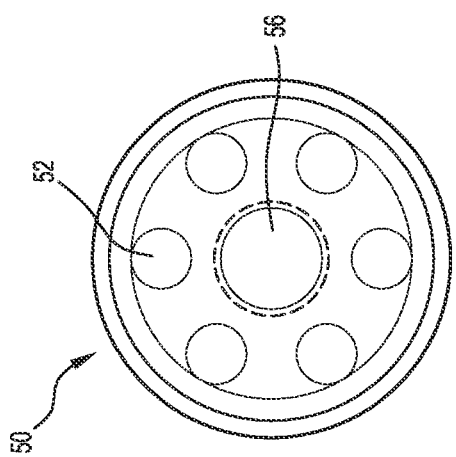
FIG. 4 is a rear elevation of the valve according to FIG. 2.

FIG. 1 shows a receptacle in the form of refrigerated container 10 which includes refrigeration unit 12 and doors 14.

In the embodiment illustrated the sealing means includes a curtain 16. The curtain preferably comprises an impervious sheet and is attached to the external walls of container 10 with tape (not shown) to form chamber 11. Modification means 9 comprising a quantity of hydrated lime held in carbon dioxide transmissible bags is located within chamber 11.

Sealing means (not shown) in the form of a cover for ventilation port 18 is located at the machinery end of the container 10. The cover comprises an impervious plastic sheet adhered with tape to the wall of the container 10. The cover is adapted to cover, and hence seal, ventilation port 18. The cover is fitted with outlet means in the form of a valve 20.

Valve 20 is located on the high pressure side of the fan so that when valve 20 is open, the chamber atmosphere is forced out of the chamber.

Inlet means in the form of valves 100 are located in the curtain 16. Ambient atmosphere may enter chamber 11 when valves 100 are open.

Controller 8 includes sensor means (not shown) in the form of an oxygen concentration measurement device. The sensor means preferably takes measurements at equally spaced intervals which may be adjusted depending upon the rate of respiration (if any) of produce in chamber 11. If the oxygen concentration falls below a predetermined value (which can be adjusted depending upon the rate of respiration (if any) of produce in the container), controller 8 sends a signal via wires 17 or other communication means to open valves 100 and 20. This allows the influx of ambient atmosphere into chamber 11 through valves 100 and the discharge of chamber atmosphere from chamber 11 through valve 20.

Figure 3:
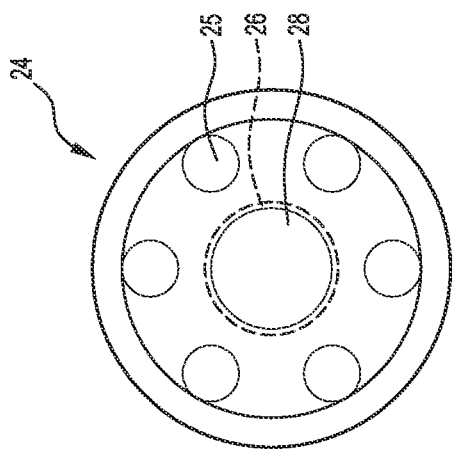
FIG. 3 is a front elevation of the valve according to FIG. 2.
Figure 2:
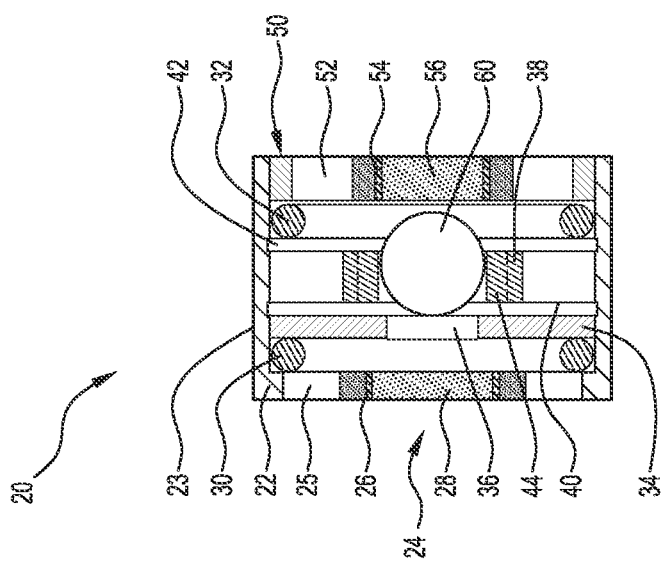
FIG. 2 is a side elevation of a valve for use at the machinery end of a refrigerated container in accordance with a preferred embodiment of the present invention.

As shown in FIG. 2, valve 20 includes a casing 22 having a circular cylindrical outer surface 23 and an apertured end piece 24. End piece 24 includes apertures 25 as shown in FIG. 3. End piece 24 contains a central circular cylindrical boss 26 as shown in FIG. 2 and in dotted outline in FIG. 3. Boss 26 contains a magnet 28.

Valve 20 includes spacer rings 30 and 32.

Valve 20 includes a reel 38 provided with flanges 40 and 42 and a central circular bore 44. Wire (not shown) is coiled around the reel 38 between the flanges 40 and 42 to create a solenoid. In the preferred embodiment illustrated, a spherical ball 60 is located in bore 44 of reel 38. Ball 60 may be substituted with a right circular cylindrical plug or a member of any suitable shape.

In the preferred embodiment illustrated, the ball 60 is magnetic ie is attracted by a magnet. The diameter of ball 60 is greater than the length of reel 38 as measured from the outer surface of flange 40 to the outer surface of flange 42 along a line parallel to the axis of bore 44. The diameter of bore 44 exceeds the diameter of ball 60.

A sealing plate 34 is provided having a central circular hole 36 which is substantially concentric with the bore 44. The diameter of the hole 36 is less than the diameter of the ball 60.

An end cap 50 is provided having 6 circular apertures 52 and central boss 54 which receives permanent magnet 56.

The valve 20 is closed when the ball 60 is located so as to seal the hole 36 in the sealing plate 34 so that no fluid may pass through the bore 44. In the preferred embodiment illustrated, the valve is held shut by virtue of magnet 28 holding the ball 60 in the closed position. It will be appreciated by those skilled in the art that other means for retaining ball 60 may be adopted.

When valve 20 is to be opened a direct current preferably in the form of a pulse may be applied to the solenoid (not shown) would around bore 44 whereby to overcome the attractive magnetic force of the magnet 28 and push ball 60 towards magnet 56.

Valve 20 is open when the ball 60 is located so as to bear against the end cap 50. If the direct current pulse ceases, valve 20 is held open by virtue of magnet 56 holding ball 60 in the open position, although it will be appreciated by those skilled in the art that other means for retaining ball 60 may be adopted. For example, valve 20 may be held open by maintaining the current through the solenoid.

When valve 20 is to be closed a direct current preferably in the form of a pulse may be applied to the solenoid in the opposite direction to the valve opening pulse so as to overcome the attractive magnetic force of magnet 56 and push ball 60 towards the closed position previously described.

It will be appreciated by those skilled in the art that valve 20 may be held closed by maintaining the current through the solenoid instead of, or in addition to, utilising the effect of magnet 28 on ball 60.

Figure 8:
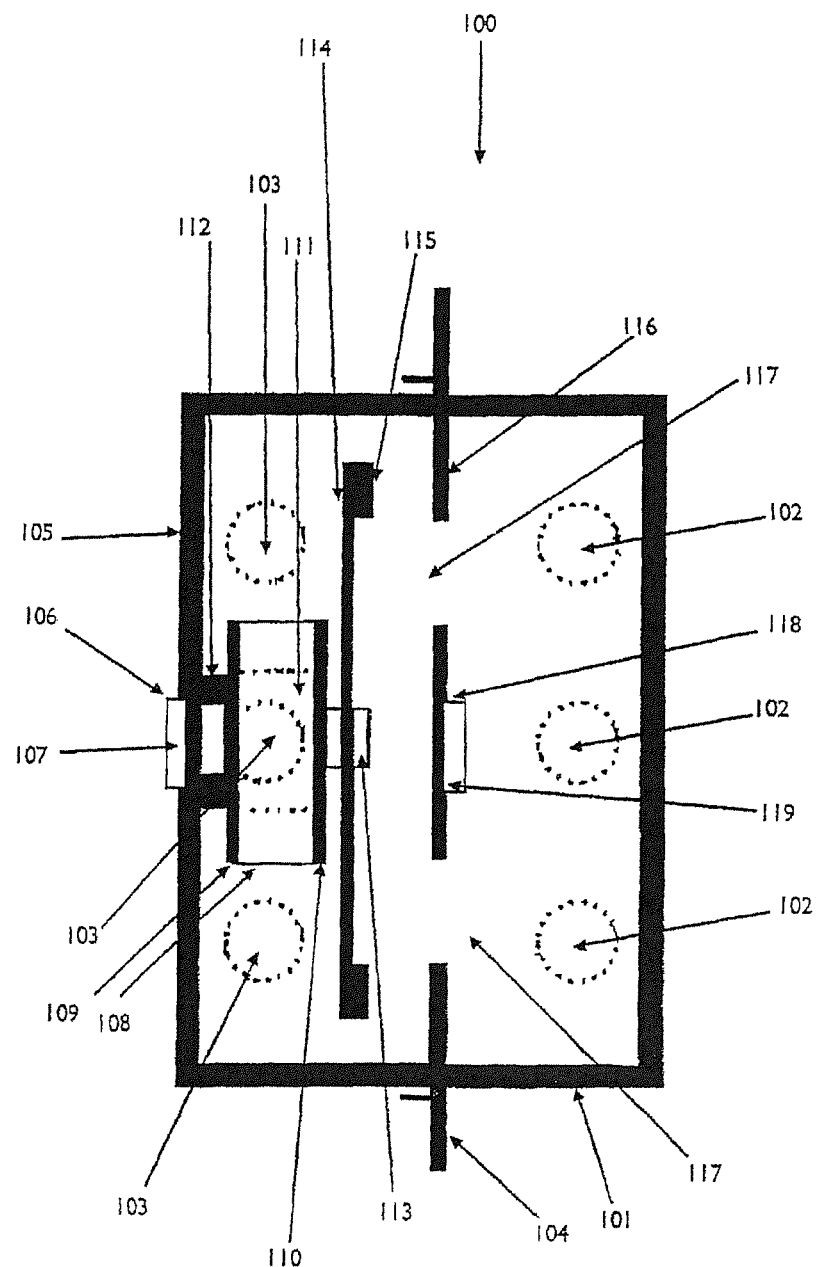
FIGS. 8 and 9 are side elevations of a valve for use in a curtain according to the preferred embodiment of FIG. 1.
Figure 9:
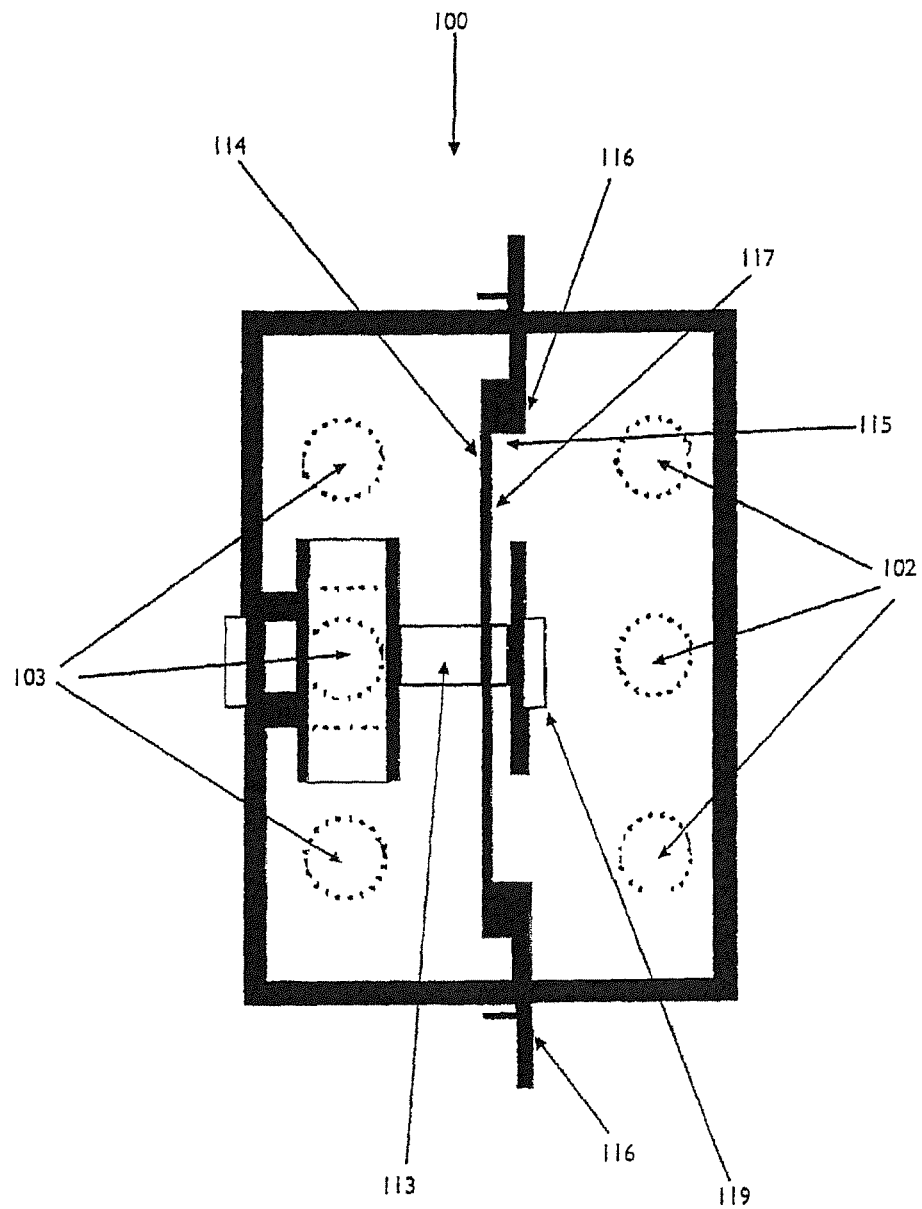
Figure 10:
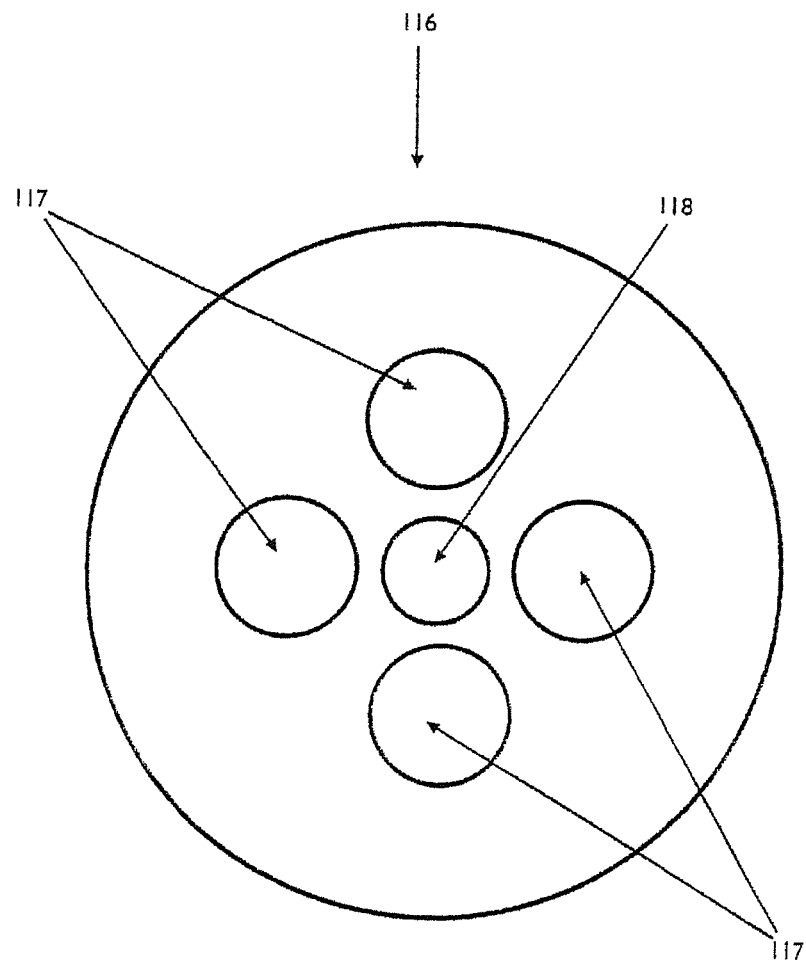
FIG. 10 is a front elevation of a plate within the valve according to FIGS. 8 and 9.

FIGS. 8 to 10 show another form of valve 100 suitable for mounting on curtain 16. As shown in FIG. 8, valve 100 includes a casing 101 having a circular cylindrical outer surface with inlet air holes 102, outlet air holes 103 and annular flange 104. In the preferred embodiment illustrated, the air holes are circular.

However, they may take the form of slots or apertures of any suitable shape. Inlet air holes 102 and outlet air holes 103 are of sufficient size to allow adequate air flow through the valve when open. Valve 100 includes an end piece 105 which contains a central circular cylindrical boss 106 for receiving magnet 107. It will be understood that the inlet air holes 102 may function as outlet air holes and the outlet air holes 103 may function as inlet air holes, depending on the direction of fluid flow through the valve.

Valve 100 includes a reel 108 provided with flanges 109 and 110 and a central circular bore 111 (the internal wall of which is shown in outline). Wire (not shown) is coiled around the reel 108 between the flanges 109 and 110 to create a solenoid.

End piece 105 includes a central circular cylindrical tube 112. Bore 111 of reel 108 is fitted over tube 112 so that reel 108 is mounted on tube 112.

A circular cylindrical rod 113 is at least partially located inside tube 112. Rod 113 is linearly slidable within tube 112. Rod 113 is magnetic, ie is attracted by a magnet. Rod 113 carries panel 114 with annular sealing ring 115.

Valve 100 contains a plate 116. As shown in FIGS. 8 and 10, plate 116 has air holes 117 and a central circular cylindrical boss 118 for receiving magnet 119.

As shown in FIG. 9, valve 100 is closed when rod 113 is located such that sealing ring 115 on panel 114 sealingly abuts plate 116. In this configuration the valve is closed since sealing ring 115 in combination with panel 114 prevents fluid passing through holes 117 and around panel 114 and thereby prevents fluid communication between holes 102 and holes 103. In the preferred embodiment illustrated, the valve is held shut by virtue of magnet 119 holding rod 113 in the closed position. It will be appreciated by those skilled in the art that other means for retaining the rod 113 may be adopted.

When valve 100 is to be opened a direct current preferably in the form of a pulse may be applied to the solenoid (not shown) wound around bore 111 of reel 108 whereby to overcome the attractive magnetic force of the magnet 119 and drive rod 113 towards magnet 107.

As shown in FIG. 8, valve 100 is open when rod 113 is located such that sealing ring 115 on panel 114 is spaced from plate 116. In the preferred embodiment illustrated in FIG. 8, magnet 107 is of sufficient strength, and rod 113 is within sufficient proximity of magnet 107 when valve 100 is in the open position, that, if the direct current pulse ceases, valve 100 is held open by virtue of magnet 107 holding rod 113 in the open position. However, it will be appreciated by those skilled in the art that other means for retaining rod 113 may be adopted. For example, valve 100 may be held open by maintaining the current through the solenoid.

In the configuration shown in FIG. 8, the valve is open since sealing ring 115 and panel 114 do not prevent fluid passing through holes 116 and around panel 113, thereby allowing fluid communication between holes 102 and holes 103.

When valve 100 is to be closed a direct current preferably in the form of a pulse may be applied to the solenoid in the opposite direction to the valve opening pulse so as to overcome the attractive magnetic force of magnet 107 and drive rod 113 towards the closed position previously described.

It will be appreciated by those skilled in the art that valve 100 may be held closed by maintaining the current through the solenoid instead of, or in addition to, utilising the effect of magnet 119 on rod 113.

Figure 5:
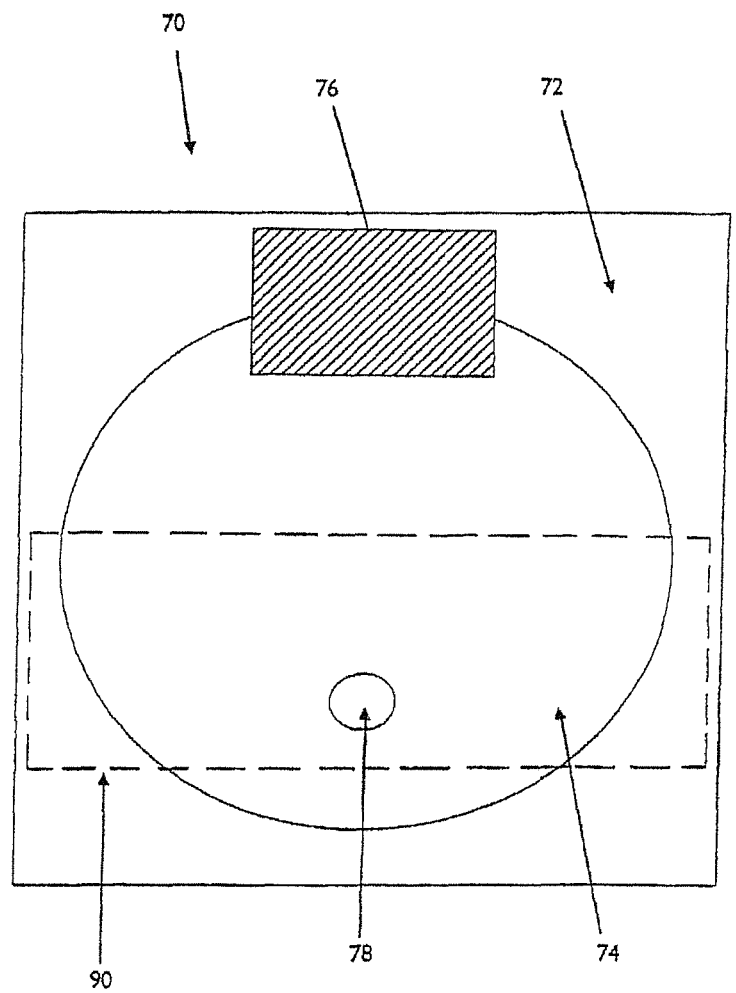
FIG. 5 is a front elevation of a valve for use in a curtain according to the preferred embodiment of FIG. 1.
Figure 6:
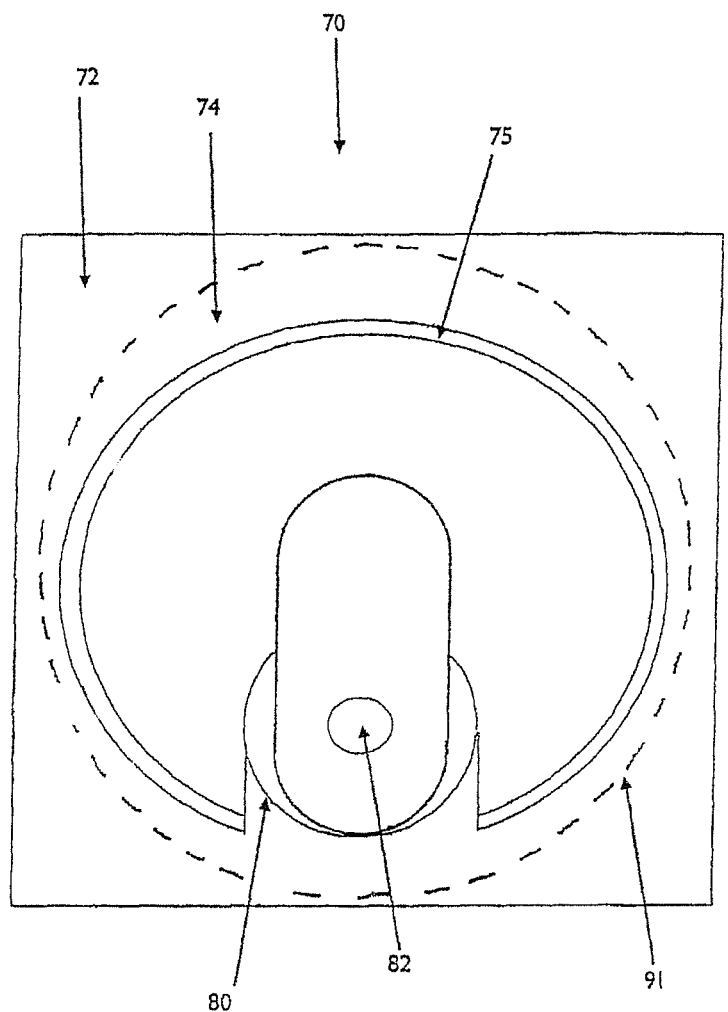
FIG. 6 is a rear elevation of the valve according to FIG. 4.
Figure 7:
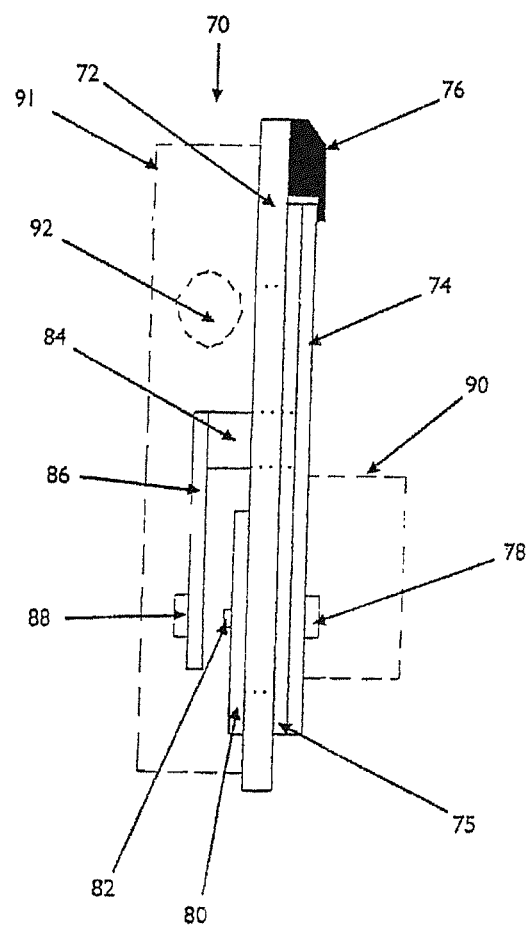
FIG. 7 is a side elevation of the valve according to FIGS. 4 and 5.

FIGS. 5 to 7 show an alternative form of valve 70 suitable for mounting on curtain 16 in the same manner as described in relation to valve 100. Valve 70 has a base 72, having a hole typically oval or circular. Flap 74 is complementary to the hole in base 72. Seal 75 extends between base 72 and flap 74. Flap 74 is hingedly mounted on base 72 by hinge 76. Magnet 78 is mounted on flap 74. Attached to the base 72 is a coil 80 around a core 82 to form a solenoid.

A spacer 84 is attached to the centre of flap 74. Arm 86, carrying magnet 88, is mounted on spacer 84.

Spacer 84, arm 86, magnet 88, core 82 and coil 80 are protected by protective shield 91. Protective shield 91 contains airholes 92. Similarly magnet 78 is protected by shield 90.

In FIG. 7 valve 70 is shown in the closed position. In the preferred embodiment, valve 70 is held closed by the magnetic attraction between magnet 78 and core 82 of the solenoid, although it will be appreciated by those skilled in the art that other means for retaining flap 78 may be adopted.

When valve 70 is to be opened, a direct current preferably in the form of a pulse may be applied to solenoid 80 so that core 82 repulses magnet 78 and attracts magnet 88. The attraction of magnet 88 to core 82 drives arm 86 towards core 82 so as to move flap 74 away from seal 75 under the influence of hinge 76 and hence open valve 70. If the direct current pulse ceases valve 70 is held open by the magnetic attraction between magnet 88 and core 82. It will be appreciated by those skilled in the art that other means of retaining arm 86 may be adopted.

When valve 70 is to be closed a direct current or pulse may be applied to solenoid 80 in the opposite direction to the valve opening pulse so that core 82 repulses magnet 88 and attracts magnet 78. Valve 70 is then hold closed as previously described.

In use, a prediction of the carbon dioxide level in the chamber based on the desired oxygen setpoint is made. The prediction is based on, amongst other things, the weight of the cargo, the temperature in the chamber, the time during which the cargo will be in transit, and the respiration quotient of the produce.

As the produce will continue to consume oxygen and hence carbon dioxide will continue to be produced, a prediction is also made based on the desired carbon dioxide setpoint, that is, the difference between the predicted carbon dioxide level (based on the predicted rate of consumption of oxygen by the produce) and the desired level. Independent control of the carbon dioxide level can be achieved by placing bags of hydrated lime of predetermined permissivity to carbon dioxide in the chamber so as to absorb the difference between the predicted and desired levels.

After produce has been loaded into container 10 curtain 16 is installed thereby forming substantially sealed chamber 11. Chamber 11 is flushed with nitrogen to lower the initial oxygen concentration within the chamber to below a predetermined maximum oxygen concentration.

During use, if controller 8 senses that the oxygen concentration within the chamber has fallen below a first predetermined minimum value, controller 8 sends a signal via wires 17 which causes both inlet means and the outlet means in the form of valves 100 and 20 respectively to open for a first predetermined length of time so as to allow air surrounding the chamber to enter chamber 11 and chamber atmosphere within the chamber to leave chamber 11 under the influence of the fan.

The influx of air into chamber 11 thereby increases the oxygen concentration within chamber 11.

If, after valves 100 and/or 20 are closed, the oxygen concentration as measured by the sensor means has not increased to at least a second predetermined minimum value, controller 8 causes both valves 100 and/or 20 to switch to an open state for a second pre-determined length of time so as to allow further air surrounding the chamber to enter chamber 11 and chamber atmosphere from within chamber 11 to exit-chamber 11 under the influence of the fan.

This process is repeated until the oxygen concentration has increased to an acceptable level.

In the embodiment illustrated ambient air is initially drawn into chamber 11 from space 15 between doors 14 and curtain 16. As chamber atmosphere is driven from chamber 11 under the influence of the fan the pressure within chamber 11 drops.

The drop in pressure within chamber 11 causes curtain 16 to bow inwardly as shown in FIG. 1. This action initially reduces the ambient pressure within space 15. However, as there is no need to have airtight door seals on container 10 for the application of the present invention, ambient air from outside container 10 is drawn through or around doors 14 into space 15 and subsequently into chamber 11.

Thus curtain 16 may act as a form of diaphragm moving with changes in respective pressure between chamber 11 and space 15 and acting to equalise the pressure therebetween when valves 100 are open. In this respect it is preferable to use valves 100 on curtain 16 rather than valves 70 since, as shown in FIG. 8, valve 100 has air holes 102 and air holes 103 which are mounted on the side of the valve. This configuration prevents fluid passage through the valve from being impeded or prevented where the valve abuts door 14 or a surface within the chamber 11.

The apparatus provided by the present invention is relatively cheap to install. The apparatus can be installed in a variety of receptacles and does not rely on the efficacy of door seals to maintain the atmosphere within the chamber.

The word 'comprising' or forms of the word 'comprising' as used in this description and in the claims do not limit the invention claimed to exclude any variants or additions.

Whilst it has been convenient to describe the invention herein in relation to particularly preferred embodiments, it is to be appreciated that other constructions and arrangements are considered as falling within the scope of the invention. Various modifications, alterations, variations and/or additions to the constructions and arrangements described herein are also considered as falling within the scope and ambit of the present invention.

APPENDIX

This Appendix details the derivation of equations for a continuous model of the chamber atmosphere. The assumptions on which this model is based are as follows:

1. The chamber atmosphere exiting the chamber through the outlet means is perfectly mixed (i.e., it is assumed that the proportions of constituent gases of the atmosphere exiting the chamber is equal to the proportions of constituent gases within the chamber).
2. The composition of the air entering the chamber through the inlet means consists of 21% oxygen and 79% nitrogen.
3. The rate of inflow of nitrogen is equal to the rate of outflow of nitrogen.
4. The system has reached equilibrium.

Figure 11:
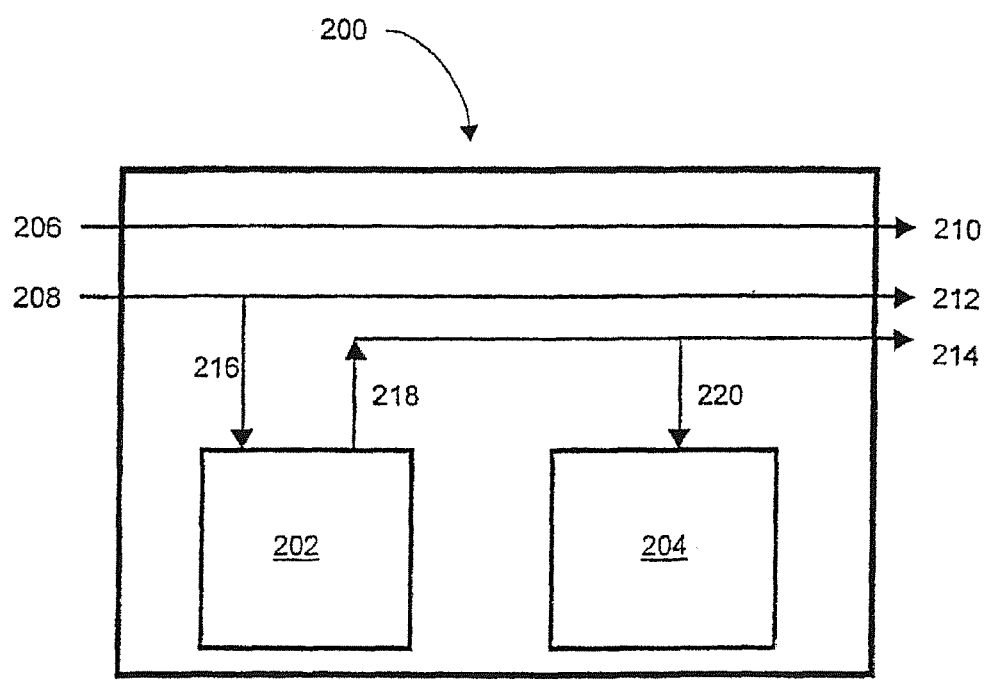
FIG. 11 is a diagrammatic representation of a chamber atmosphere model.

A diagrammatic representation of the model is given in FIG. 11. The symbols will now be defined with reference to the model shown in the figure. The chamber is represented as 200. The inflow of nitrogen from ambient air is designated $f_{1,N_2}$ and is shown as 206. The inflow of oxygen from ambient air is designated $f_{1,O_2}$ and is shown as 208. The outflow of nitrogen from chamber 200 is designated $f_{2,N_2}$ and is shown as 210. The outflow of oxygen from chamber 200 is designated $f_{2,O_2}$ and is shown as 212. The outflow of carbon dioxide from chamber 200 is designated $f_{2,CO_2}$ and is shown as 214.

The total inflow rate (not shown) is designated $f_{v_1}$ and represents the sum of $f_{1,N_2}$ and $f_{1,O_2}$. The total outflow rate (not shown) is designated $f_{v_2}$ and represents the sum of $f_{2,N_2}$, $f_{2,O_2}$ and $f_{2,CO_2}$.

The respiring produce 202 consumes oxygen at a flow rate represented by 216, designated $r_{O_2}$ and produces carbon dioxide at a flow rate represented by 218, designated $r_{CO_2}$. Carbon dioxide removal means 204 removes carbon dioxide at a flow rate represented by 220 and designated $a_{CO_2}$.

Inside the chamber, the oxygen concentration is designated $p_{O_2}$ and is assumed to be at the setpoint because the system is assumed to have reached equilibrium. The nitrogen concentration is designated $p_{N_2}$ and the carbon dioxide concentration is designated $p_{CO_2}$.

By definition, the sum of the concentrations in the chamber is unity:

$$p_{O_2} + p_{CO_2} + p_{N_2} = 1 \tag{1}$$

It is assumed that the inflow of nitrogen is equal to the outflow of nitrogen:

$$f_{2,N_2} = p_{N_2} f_{v_2}$$
$$= f_{1,N_2}$$
$$= 0.79 f_{v_1}$$

Consequently:

$$f_{v_1} = \frac{p_{N_2}}{0.79} f_{v_2} \tag{2}$$

The outflow of oxygen from the chamber is equal to the inflow of oxygen into the chamber less the rate of oxygen consumption through respiration:

$$f_{2,O_2} = f_{1,O_2} - r_{O_2}$$

Rearranging:

$$f_{1,O_2} = f_{2,O_2} + r_{O_2} \qquad (3)$$
$$= p_{O_2} f_{v_2} + r_{O_2}$$

The inflow of oxygen is the same proportion of the total inflow as the proportion of oxygen in air:

$$f_{1,O_2} = 0.21 f_{v_1} \qquad (4)$$

Setting the right hand side of (3) equal to the right hand side of (4) and rearranging:

$$f_{v_1} = \frac{p_{O_2} f_{v_2} + r_{O_2}}{0.21} \qquad (5)$$

Setting the right hand side of (2) equal to the right hand side of (5):

$$\frac{p_{N_2}}{0.79} f_{v_2} = \frac{p_{O_2} f_{v_2} + r_{O_2}}{0.21}$$

Rearranging:

$$f_{v_2} = \frac{0.79 r_{O_2}}{0.21 p_{N_2} - 0.79 p_{O_2}} \qquad (6)$$

The total outflow is equal to the total inflow less the flow of oxygen consumed by respiration plus the flow of carbon dioxide produced by respiration less the removal of carbon dioxide by the carbon dioxide removal means:

$$f_{v_2} = f_{v_1} - r_{O_2} + r_{CO_2} - a_{CO_2} \qquad (7)$$

Substituting (5) and (6) into (7) and solving for $p_{CO_2}$:

$$p_{CO_2} = \frac{\left(\left(\frac{r_{CO_2}}{r_{O_2}}\right) - \left(\frac{a_{CO_2}}{r_{O_2}}\right)\right)(0.21 - p_{O_2})}{0.79 + 0.21\left(\frac{r_{CO_2}}{r_{O_2}}\right) - 0.21\left(\frac{a_{CO_2}}{r_{O_2}}\right)} \qquad (8)$$

Noting that the quantity $$\left(\frac{r_{CO_2}}{r_{O_2}}\right)$$

is the respiration quotient RQ, then equation (8) is as follows when $a_{CO_2}$ is zero (designated $p^*_{CO_2}$):

$$p^*_{CO_2} = \frac{RQ \cdot (0.21 - p_{O_2})}{0.79 + 0.21 \cdot RQ} \qquad (9)$$

Equation (8) may be rearranged to solve for $a_{CO_2}$:

$$a_{CO_2} = r_{CO_2} - \frac{0.79 p_{CO_2} r_{O_2}}{(0.21 - p_{O_2}) - 0.21 p_{CO_2}} \qquad (10)$$

Equation (10) may be recast as follows by substituting an expression involving $p^*_{CO_2}$ for the expression $(0.21 - p_{O_2})$, and rearranging:

$$\frac{a_{CO_2}}{r_{CO_2}} = \frac{(p^*_{CO_2} - p_{CO_2})(0.79 + 0.21 RQ)}{p^*_{CO_2}(0.79 + 0.21 RQ) - 0.21 RQ p_{CO_2}} \qquad (11)$$

Equation (11) may be approximated as follows since the expression (0.79+0.21 RQ) is generally close to unity:

$$\frac{a_{CO_2}}{r_{CO_2}} \approx \frac{p^*_{CO_2} - p_{CO_2}}{p^*_{CO_2} - 0.21 RQ p_{CO_2}} \qquad (12)$$

Equation (12) shows how, as an approximation, the ratio of the rate of carbon dioxide absorption to the rate of carbon dioxide production varies as a function of the equilibrium carbon dioxide concentration in the absence of carbon dioxide absorption and the equilibrium carbon dioxide concentration with carbon dioxide absorption.

What is claimed is:

1. A method for adjusting the atmosphere within a chamber containing respiring produce, the chamber having inlet means to permit ambient atmosphere to enter the chamber, and outlet means to permit chamber atmosphere to exit the chamber, the method comprising:
    (a) monitoring the oxygen concentration within the chamber;
    (b) following detection that the oxygen concentration in the chamber has fallen below a predetermined amount as a result of the consumption of oxygen by the respiring produce, causing or permitting ambient atmosphere to enter the chamber so that the amount of oxygen in the chamber increases to maintain the oxygen concentration above a preset oxygen concentration to prolong the storage life of the respiring produce, the preset oxygen concentration being greater than zero but less than an oxygen concentration in ambient air; and
    (c) without actively monitoring and actively controlling the carbon dioxide concentration within the chamber, continuously removing the carbon dioxide from the chamber atmosphere substantially at a predetermined carbon dioxide removal rate by using an amount of a carbon dioxide absorbing material in the chamber in communication with the chamber atmosphere, the predetermined carbon dioxide removal rate having been selected such that a non-zero carbon dioxide concentration is maintained within the chamber atmosphere, which does not substantially exceed a predetermined level, in order to maintain the carbon dioxide concentration within a predetermined desired range to inhibit deterioration of the respiring produce, wherein the amount of carbon dioxide absorbing material in the chamber maintains the carbon dioxide concentration within the predetermined range.

2. The method according to claim 1, wherein the predetermined carbon dioxide removal rate is calculated from a formula derived from a mathematical model of the proportions of the chamber atmosphere subject to the requirement that the oxygen concentration within the chamber be substantially maintained at a predetermined amount, and wherein said predetermined carbon dioxide removal rate is calculated from a formula that produces a result substantially equal to the result produced by a calculation in accordance with the following formula:

$$a_{CO_2} = r_{CO_2} - \frac{0.79 p_{CO_2} r_{O_2}}{(0.21 - p_{O_2}) - 0.21 p_{CO_2}}$$

where $a_{CO_2}$ is the carbon dioxide removal rate; $p_{O_2}$ is the oxygen setpoint, expressed as a proportion; $p_{CO_2}$ is the desired carbon dioxide concentration within the chamber, expressed as a proportion; $r_{O_2}$ is the respiration rate; and $r_{CO_2}$ is the rate of production of carbon dioxide through respiration.

3. The method according to claim 1, wherein said carbon dioxide absorbing material is contained in at least one carbon dioxide transmissible container, said at least one carbon dioxide transmissible container being selected so that the rate of carbon dioxide transmission into said at least one carbon dioxide transmissible container is substantially equal to said predetermined carbon dioxide removal rate.

4. The method according to claim 2, wherein said carbon dioxide absorbing material is contained in at least one carbon dioxide transmissible container, said at least one carbon dioxide transmissible container being selected so that the rate of carbon dioxide transmission into said at least one carbon dioxide transmissible container is substantially equal to said predetermined carbon dioxide removal rate.

5. The method according to claim 1, wherein ambient atmosphere is caused to enter the chamber by way of the inlet means, including the step of opening the inlet mean for a time approximately proportional to the difference between a detected oxygen concentration and an oxygen setpoint.

6. The method according to claim 5, wherein, if the difference between the detected oxygen concentration and the oxygen setpoint exceeds a predetermined amount, the inlet means is maintained open until detection that the oxygen concentration in the chamber has exceeded a predetermined value.

7. The method according to claim 1, wherein removal of chamber atmosphere from the chamber by way of the outlet means causes ambient atmosphere to enter the chamber by way of the inlet means.

8. The method according to claim 1, wherein the chamber is substantially sealed against leakage, such that the rate of consumption of oxygen by the respiring produce exceeds the rate of leakage of oxygen into the chamber from the ambient atmosphere.

9. A method for adjusting the atmosphere within a chamber containing respiring produce, the respiring produce being maintained within the chamber for a storage time, the method comprising:
(a) placing an amount of carbon dioxide absorbing material in communication with the chamber so as to absorb the difference between a predicted level of carbon dioxide in the chamber based on the rate of consumption of oxygen by the produce and a desired carbon dioxide level so that a non-zero carbon dioxide concentration is maintained in the chamber during the storage time without active monitoring and control of the carbon dioxide concentration within the chamber, the non-zero carbon dioxide concentration not substantially exceeding said desired level in order to inhibit deterioration of the respiring produce;
(b) substantially sealing the chamber;
(c) monitoring oxygen concentration within the chamber;
(d) adjusting an oxygen level in the chamber to a level above a desired oxygen setpoint to prolong the storage life of the respiring produce, the desired oxygen setpoint being greater than zero but less than an oxygen concentration in ambient air;
(e) permitting the oxygen level in the chamber to degrade to about the oxygen setpoint as a consequence of oxygen consumed by the respiring produce being converted to carbon dioxide;
(f) removing chamber atmosphere from the chamber and admitting ambient atmosphere into the chamber; and
(g) repeating steps (f), (g) and (h) as required if the oxygen level falls below the oxygen setpoint, to maintain the oxygen level in the region of the oxygen setpoint.

10. The method according to claim 9, wherein a rate of removal of carbon dioxide from the chamber is calculated from a formula that produces a result substantially equal to the result produced by a calculation in accordance with the following formula:

$$a_{CO_2} = r_{CO_2} - \frac{0.79 p_{CO_2} r_{O_2}}{(0.21 - p_{O_2}) - 0.21 p_{CO_2}}$$

where $a_{CO_2}$ is the carbon dioxide removal rate; $p_{O_2}$ is the oxygen setpoint, expressed as a proportion; $p_{CO_2}$ is the desired carbon dioxide concentration within the chamber, expressed as a proportion; $r_{O_2}$ is the respiration rate; and $r_{CO_2}$ is the rate of production of carbon dioxide through respiration.

11. A method for adjusting the atmosphere within a chamber containing respiring produce, the respiring produce being maintained within the chamber for a storage time, the method comprising:
(a) maintaining the oxygen concentration in the chamber atmosphere substantially at a predetermined oxygen setpoint to prolong the storage life of the respiring produce, the oxygen setpoint being greater than zero but less than an oxygen concentration in ambient air; and
(b) without active monitoring and control of carbon dioxide concentration within the chamber, continuously removing the carbon dioxide from the chamber atmosphere substantially at a predetermined carbon dioxide removal rate with an amount of carbon dioxide absorbing material in communication with the chamber atmosphere, the predetermined rate having been selected such that a non-zero carbon dioxide concentration is maintained within the chamber atmosphere, which does not substantially exceed a predetermined amount, thereby to maintain the carbon dioxide concentration within a pre-determined desired range for the storage time in order to inhibit deterioration of the respiring produce,
wherein the oxygen concentration in the chamber atmosphere is maintained substantially at the setpoint by: (i) monitoring the oxygen concentration in the chamber and following detection that the oxygen concentration has fallen below the setpoint, or below a tolerance about the setpoint; (ii) admitting ambient air into the chamber so that the amount of oxygen in the chamber increases; and (iii) causing or permitting chamber atmosphere to exit the chamber.

12. The method according to claim 11, wherein said predetermined carbon dioxide removal rate is calculated from a formula that produces a result substantially equal to the result produced by a calculation in accordance with the following formula:

$$a_{CO_2} = r_{CO_2} - \frac{0.79 p_{CO_2} r_{O_2}}{(0.21 - p_{O_2}) - 0.21 p_{CO_2}}$$

where $a_{CO_2}$ is the carbon dioxide removal rate; $p_{O_2}$ is the oxygen setpoint, expressed as a proportion; $p_{CO_2}$ is the desired carbon dioxide concentration within the chamber, expressed as a proportion; $r_{O_2}$ is the respiration rate; and $r_{CO_2}$ is the rate of production of carbon dioxide through respiration.

13. The method according to claim 11, wherein the carbon dioxide absorbing material is contained in at least one carbon dioxide transmissible container, the at least one carbon dioxide transmissible container being selected so that the rate of carbon dioxide transmission into said at least one carbon dioxide transmissible container is substantially equal to said predetermined carbon dioxide removal rate.

14. The method according to claim 11, wherein ambient atmosphere is admitted into the chamber by way of an inlet means opened for a time determined in accordance with a difference between the detected oxygen concentration and the oxygen setpoint.

15. A method for adjusting the atmosphere within a chamber containing respiring produce, the method involving monitoring the oxygen concentration within the chamber without actively monitoring and controlling the carbon dioxide concentration within the chamber, the method comprising the steps of maintaining the oxygen concentration in the chamber atmosphere substantially at a predetermined oxygen setpoint to prolong the storage life of the respiring produce, the predetermined oxygen setpoint being greater than zero but less than an oxygen concentration in ambient air, predicting the carbon dioxide concentration in the chamber that would be expected to result in the absence of any adjustment to the carbon dioxide concentration, and independently adjusting the carbon dioxide concentration in the chamber by determining the difference between the predicted level of carbon dioxide in the chamber and a desired carbon dioxide concentration so that the carbon dioxide concentration in the chamber is maintained at a non-zero equilibrium concentration within a pre-determined range for the storage time, and installing in the chamber one or more containers of hydrated lime of predetermined carbon dioxide transmissibility in communication with the chamber atmosphere whereby carbon dioxide is absorbed into the containers so that the concentration of carbon dioxide in the chamber is maintained at the non-zero equilibrium concentration, in order to inhibit deterioration of the respiring produce.

16. The method according to claim 9, further comprising, before said step of substantially sealing the chamber, the step of flushing the chamber with a purging gas having a low oxygen concentration or no oxygen.

\* \* \* \* \*